US010298449B2

(12) United States Patent
Gan et al.

(10) Patent No.: US 10,298,449 B2
(45) Date of Patent: May 21, 2019

(54) AUTOMATICALLY GENERATED VIRTUAL NETWORK ELEMENTS FOR VIRTUALIZED PACKET NETWORKS

(71) Applicant: Sprint Communications Company L.P., Overland Park, KS (US)

(72) Inventors: Seng Chai Gan, Ashburn, VA (US); Aaron Paul Hinkle, Centreville, VA (US); Michael Francis Fiumano, McLean, VA (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 15/814,264

(22) Filed: Nov. 15, 2017

(65) Prior Publication Data
US 2018/0077013 A1    Mar. 15, 2018

Related U.S. Application Data

(63) Continuation of application No. 14/170,930, filed on Feb. 3, 2014, now Pat. No. 9,860,117.

(51) Int. Cl.
*G06F 9/455* (2018.01)
*H04L 12/24* (2006.01)
(Continued)

(52) U.S. Cl.
CPC ...... *H04L 41/0806* (2013.01); *G06F 9/45558* (2013.01); *H04L 61/103* (2013.01);
(Continued)

(58) Field of Classification Search
None
See application file for complete search history.

(56) References Cited

U.S. PATENT DOCUMENTS 7,440,415 B2    10/2008    Wild, III et al.
7,835,372 B2    11/2010    Wang et al.
(Continued)

FOREIGN PATENT DOCUMENTS

WO    2000076122    12/2000
WO    2013113264    8/2013

OTHER PUBLICATIONS

Feller, et al.; "Snooze: A Scalable and Autonomic Virtual Machine Management Framework for Private Clouds;" 2012 12th IEEE/ACM International Symposium on Cluster, Cloud and Grid Computing; May 13, 2012; pp. 482-489; IEEE Computer Society; Rennes, France.
(Continued)

*Primary Examiner* — Sm A Rahman
*Assistant Examiner* — Dae Kim

(57) ABSTRACT

A computer system establishes data communications for a virtual machine that is configured with an enhanced Media Access Control (MAC) address. A management computer instantiates the virtual machine responsive to the enhanced MAC address. The management computer automatically instantiates a virtual Local Area Network (vLAN) and a virtual Switch (vSW) on the vLAN to serve the virtual machine using the enhanced MAC address. The management computer allocates an Internet Protocol (IP) address to the virtual machine and automatically instantiates a virtual Router (vRTR) to serve the vSW using the IP address. A network computer executes the virtual machine, the vLAN, the vSW, and the vRTR to exchange user data between the virtual machine and a data communication network over the vSW, vLAN, and vRTR using the enhanced MAC address and the IP address.

20 Claims, 10 Drawing Sheets

(51) Int. Cl.
*H04L 29/12* (2006.01)
*H04L 12/26* (2006.01)

(52) U.S. Cl.
CPC .............. *H04L 61/6004* (2013.01); *G06F 2009/45595* (2013.01); *H04L 43/0888* (2013.01); *H04L 43/16* (2013.01); *H04L 61/2015* (2013.01)

(56) References Cited

U.S. PATENT DOCUMENTS

| | | |
|---|---|---|
| 7,965,709 B2 | 6/2011 | Du |
| 8,447,909 B2 | 5/2013 | Corrigan et al. |
| 8,477,782 B2 | 7/2013 | Timm et al. |
| 9,116,727 B2 | 8/2015 | Benny et al. |
| 2003/0101239 A1 | 5/2003 | Ishizaki |
| 2006/0072584 A1 | 4/2006 | Goto et al. |
| 2006/0155828 A1 | 7/2006 | Ikeda et al. |
| 2007/0104192 A1 | 5/2007 | Yoon et al. |
| 2008/0159277 A1* | 7/2008 | Vobbilisetty .......... H04L 12/462 370/357 |
| 2009/0083445 A1 | 3/2009 | Ganga |
| 2010/0257263 A1 | 10/2010 | Casado et al. |
| 2011/0138384 A1 | 6/2011 | Bozek et al. |
| 2012/0033672 A1 | 2/2012 | Page et al. |
| 2012/0278802 A1 | 11/2012 | Nilakantan et al. |
| 2013/0070762 A1 | 3/2013 | Adams et al. |
| 2013/0125124 A1 | 5/2013 | Kempf et al. |
| 2013/0173781 A1 | 7/2013 | Abuelsaad et al. |
| 2014/0082616 A1 | 3/2014 | Kurita |
| 2014/0101656 A1* | 4/2014 | Zhu .................... H04L 63/0227 718/1 |
| 2014/0337834 A1* | 11/2014 | Adogla ............... G06F 9/45558 718/1 |
| 2014/0372614 A1 | 12/2014 | Tan et al. |
| 2015/0071110 A1* | 3/2015 | Kothari ............... H04L 41/0846 370/254 |
| 2016/0191371 A1* | 6/2016 | Dujodwala ......... H04L 12/4675 370/254 |

OTHER PUBLICATIONS

"Dynamic VLANs;" The Wayback Machine; May 29, 2011; 5 pages; Firewall.cx.
"Cisco Jedi;" Notes from the Battlefield; Apr. 25, 2013; 13 pages; ciscojedi.wordpress.com.

* cited by examiner

AUTOMATICALLY GENERATED VIRTUAL NETWORK ELEMENTS FOR VIRTUALIZED PACKET NETWORKS

RELATED CASES

This patent application is a continuation of U.S. patent application Ser. No. 14/170,930 that was filed on Feb. 3, 2014 and is entitled "AUTOMATICALLY GENERATED VIRTUAL NETWORK ELEMENTS FOR VIRTUALIZED PACKET NETWORKS." U.S. patent application Ser. No. 14/170,930 is hereby incorporated by reference into this patent application.

TECHNICAL FIELD

Aspects of the disclosure are related to the field of network communications and virtualized computing and networking systems.

TECHNICAL BACKGROUND

Wireless communication networks typically employ various wireless access nodes and communication systems spread over geographic locations to provide wireless access to communication services for user devices. These wireless communication networks include backend computing systems and network infrastructure elements to support not only the user traffic, but also overhead and administration traffic between the various communication nodes of the communication network.

Backend computing systems can be utilized to handle traffic of applications and databases that support a variety of network-centric services of the wireless communication network. These wireless communication networks can include nationwide cellular voice and data systems, deployed for connecting a multitude of end users to various services, such as communication application servers, authorization and authentication databases, among other applications and services.

Virtualization can be employed to run these applications, services, and databases in virtual machines on flexible hardware systems instead of on physically installed and separated server devices. However, at some level, physical computing machines are employed, and typically use physical networking elements to connect the various elements and nodes together. However, these various physical network elements can be troublesome, and time consuming to configure and manage, leading to downtime, errors, and wasted physical resources when traffic loads are low.

Overview

A computer system establishes data communications for a virtual machine that is configured with an enhanced Media Access Control (MAC) address. A management computer instantiates the virtual machine responsive to the enhanced MAC address. The management computer automatically instantiates a virtual Local Area Network (vLAN) and a virtual Switch (vSW) on the vLAN to serve the virtual machine using the enhanced MAC address. The management computer allocates an Internet Protocol (IP) address to the virtual machine and automatically instantiates a virtual Router (vRTR) to serve the vSW using the IP address. A network computer executes the virtual machine, the vLAN, the vSW, and the vRTR to exchange user data between the virtual machine and a data communication network over the vSW, vLAN, and vRTR using the enhanced MAC address and the IP address.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

DETAILED DESCRIPTION

Figure 1:
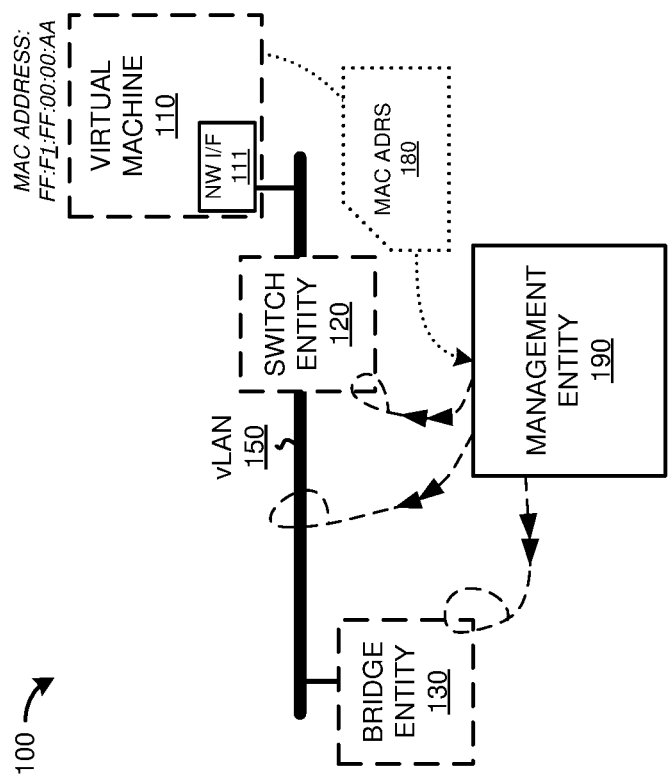
FIG. 1 is a system diagram illustrating a virtualized communication networking environment.

As a first example of a virtualized communication networking environment, FIG. 1 is provided. FIG. 1 is a system diagram illustrating virtualized communication networking environment 100. Virtualized communication networking environment 100 includes virtual machine 110, virtual switch entity 120, virtual bridge entity 130, virtualized local area network (vLAN) 150, and management entity 190. Virtual machine 110, virtual switch entity 120, and virtual bridge entity 130 communicate over virtualized local area network 150.

In operation, virtual machine 110 can include an application, operating system, among other virtualized elements associated with a virtual machine. Virtual machine 110 also includes virtual network interface 111 for communicating with other network elements. Virtual machine 110 can exchange communications over vLAN 150 via virtual switch entity 120, and with other elements not shown in FIG. 1 through virtual bridge entity 130.

Figure 2:
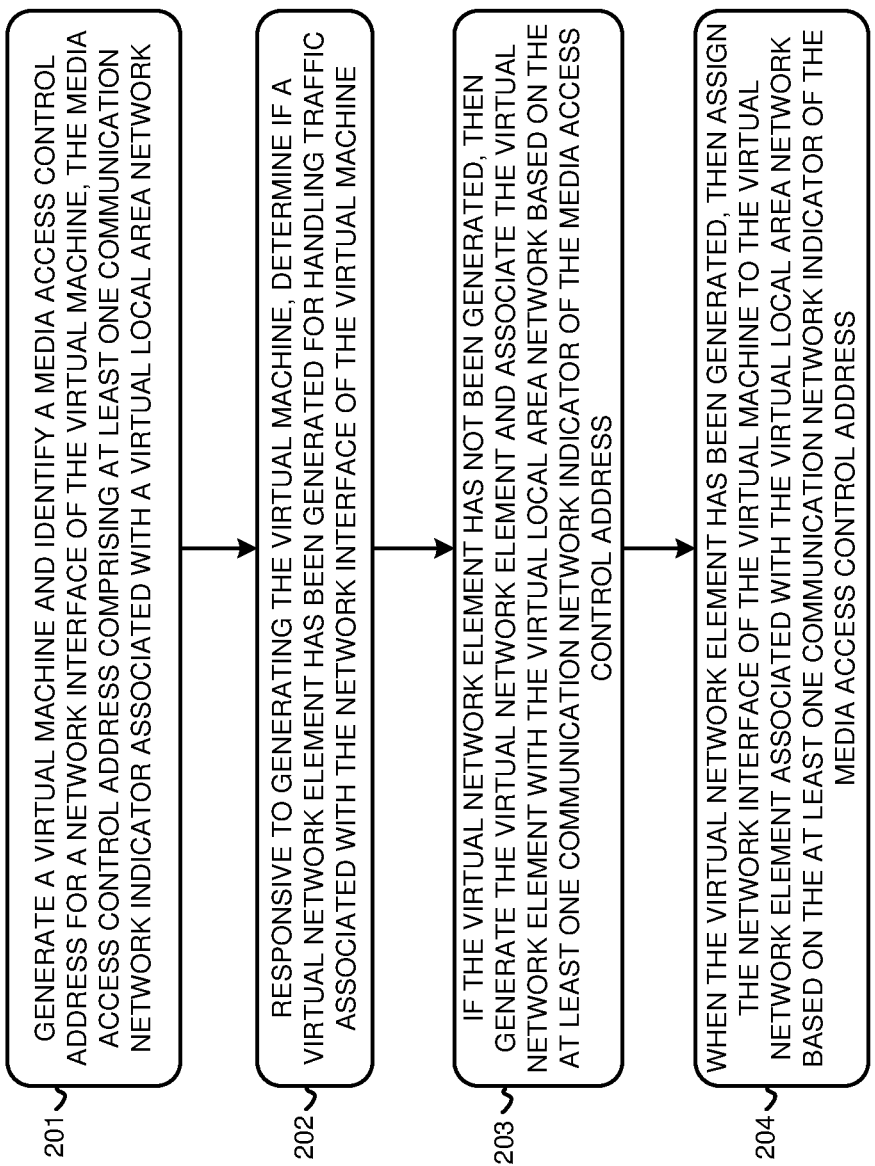
FIG. 2 is a flow diagram illustrating a method of operation of a virtualized communication networking environment.

Management entity 190 controls the generation of the various entities in network communication system 100. Specifically, during an initial time, virtual machine 110, virtual switch entity 120, virtual bridge entity 130, and virtualized local area network 150 might not have been yet generated and thus do not exist. Responsive to virtual machine 110 becoming active or being generated, management entity 190 can generate ones of virtual switch entity 120, virtual bridge entity 130, and virtualized local area network 150. FIG. 2 discusses this process in more detail.

FIG. 2 is a flow diagram illustrating a method of operating virtualized communication networking environment 100 as shown in FIG. 1. The operations of FIG. 2 are referenced below parenthetically. In FIG. 2, management system 190 generates (201) a virtual machine and identifies a media access control (MAC) address for a network interface of the virtual machine, the MAC address comprising at least one communication network indicator associated with a virtualized local area network. Initially, virtual machine 110 is not generated and responsive to a command, instruction, or activity, management entity 190 generates virtual machine 110. In some examples, virtual machine 110 is already generated by other systems, and responsive to user or network activity, such as a user desiring to use an application, database server, or other entity supported by virtual machine 110.

During generation of virtual machine 110, a virtual network interface is also established, namely network interface 111. Network interface 111 can include any network interface for establishing networked communications between virtual machine 110 and external virtual or non-virtual entities. Network interface 111 can include an Ethernet interface, among other network interfaces. Network interface 111 has at least one media access control address (MAC address) 180 associated therewith, where MAC address 180 is used by a particular media access layer of network interface 111 for transmitting and receiving communications on a network. MAC address 180 of network interface 111 includes at least one communication network indicator that identifies a particular network that network interface 111 should be associated with during generation or later interconnection. For example, the communication network indicator can include one or more bits of MAC address 180 that indicate to management system 190 that network interface 111 should be associated with a particular local area network or virtualized local area network. The communication network indicator can be predetermined and programmed into a generation routine for virtual machine 110 that automatically includes the communication network indicator in MAC address 180 for network interface 111.

As a non-limiting example of a MAC address and communication network indicator, FIG. 1 shows a MAC address of six octets, namely, FF:F1:FF:00:00:AA for network interface 111. The "1" digit in the second octet of the MAC address indicates a particular virtualized local area network that network interface 111 should be associated with once virtual machine 110 is generated or active, while the remainder of the bits can merely be organizationally unique identifiers (OUIs), network interface controller (NIC) specific bits, or other bits. Furthermore, the communication network indicator can comprise more than one bit, and can be positioned in any of the octets of the MAC address.

Responsive to generating the virtual machine, management system 190 determines (202) if a virtual network element has been generated for handling traffic associated with the network interface of the virtual machine. Management system 190 determines if vLAN 150, virtual switch entity 120, or virtual bridge entity 130 have been generated to service communications for virtual machine 110. Initially, one or more of these virtualized network elements might not yet have been generated, such as when no other virtual machines associated with vLAN 150, virtual switch entity 120, or virtual bridge entity 130 have been established or active. However, in other examples, one or more of vLAN 150, virtual switch entity 120, or virtual bridge entity 130 might already have been generated due to another virtual machine that shares the communication network indicator in an associated MAC address for that other virtual machine.

If the virtual network element has not been generated, then management system 190 generates (203) the virtual network element and associates the virtual network element with the virtualized local area network based on the at least one communication network indicator of the media access control address. For example, if none of elements 120, 130, and 150 have been generated, then management entity 190 first associates network interface 111 of virtual machine 110 with vLAN 150. To handle network traffic associated with network interface 111, virtual switch entity 120 is then generated and associated with vLAN 150 and network interface 111. To handle communication with other vLANs or to provide a level of isolation for virtual machine 110 on vLAN 150, virtual bridge entity 130 can be generated and associated with vLAN 150. These various virtual network elements are automatically generated and associated with network interface 111 of virtual machine 110 based on management entity 190 detecting the communication network indicator included in MAC address 180 associated with network interface 111.

When the virtual network element has been generated, then management system 190 assigns (204) network interface 111 of virtual machine 110 to the virtual network element associated with the virtualized local area network based on the at least one communication network indicator of the media access control address. One or more of the virtual network elements might have already been generated, such as when virtual machine 110 or another virtual machine has already been generated and active. For example, a timer or tear-down time limit can be placed on the various virtual network elements of FIG. 1, and when no further traffic or no further virtual machines are using the various virtual network elements of FIG. 1, then these virtual network elements can be removed, inactivated, or otherwise un-instantiated. However, if these timers or tear-down time limits have not been reached, or if another virtual machine is still communicating through ones of the virtual network elements, then one or more of these virtual network elements might already have been generated. In such cases, management entity 190 can assign network interface 111 of virtual machine 110 to ones of these virtual network elements based on the communication network indicator in MAC address 180. This assignment can be responsive to virtual machine 110 becoming active or being generated, such as in operation 201.

Figure 3:
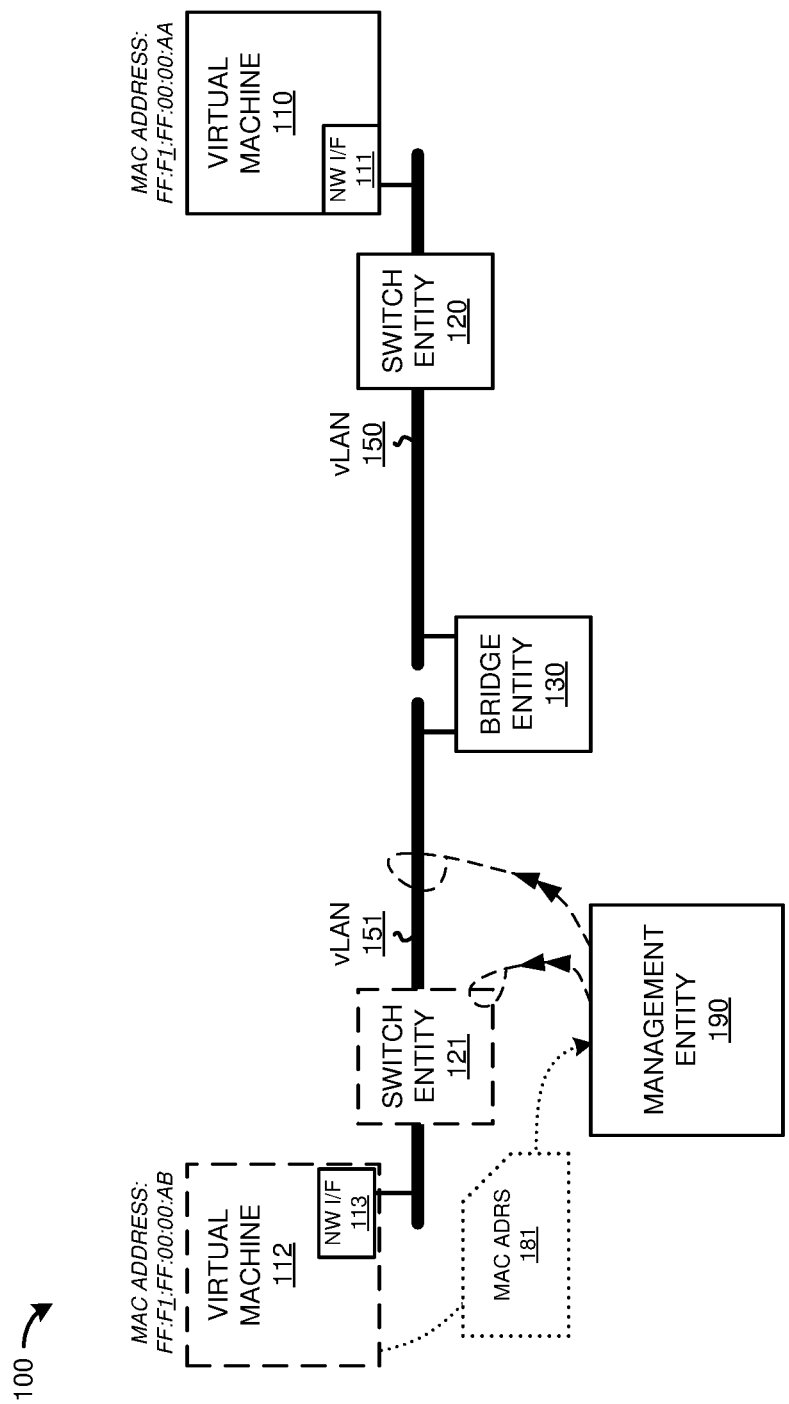
FIG. 3 is a system diagram illustrating a virtualized communication networking environment.

As a second example of a virtualized communication networking environment, FIG. 3 is provided. FIG. 3 is a system diagram illustrating virtualized communication networking environment 100. FIG. 3 adds additional virtualized elements, once the elements of FIG. 1 have been generated. As in FIG. 1, virtualized communication networking environment 100 includes virtual machine 110, virtual switch entity 120, virtual bridge entity 130, virtualized local area network (vLAN) 150, and management entity 190. Virtual machine 110, virtual switch entity 120, and virtual bridge entity 130 communicate over virtualized local area network 150. Additionally, as shown in FIG. 3, environment 100 also includes virtual machine 112, virtual switch entity 121, and vLAN 151.

Figure 4:
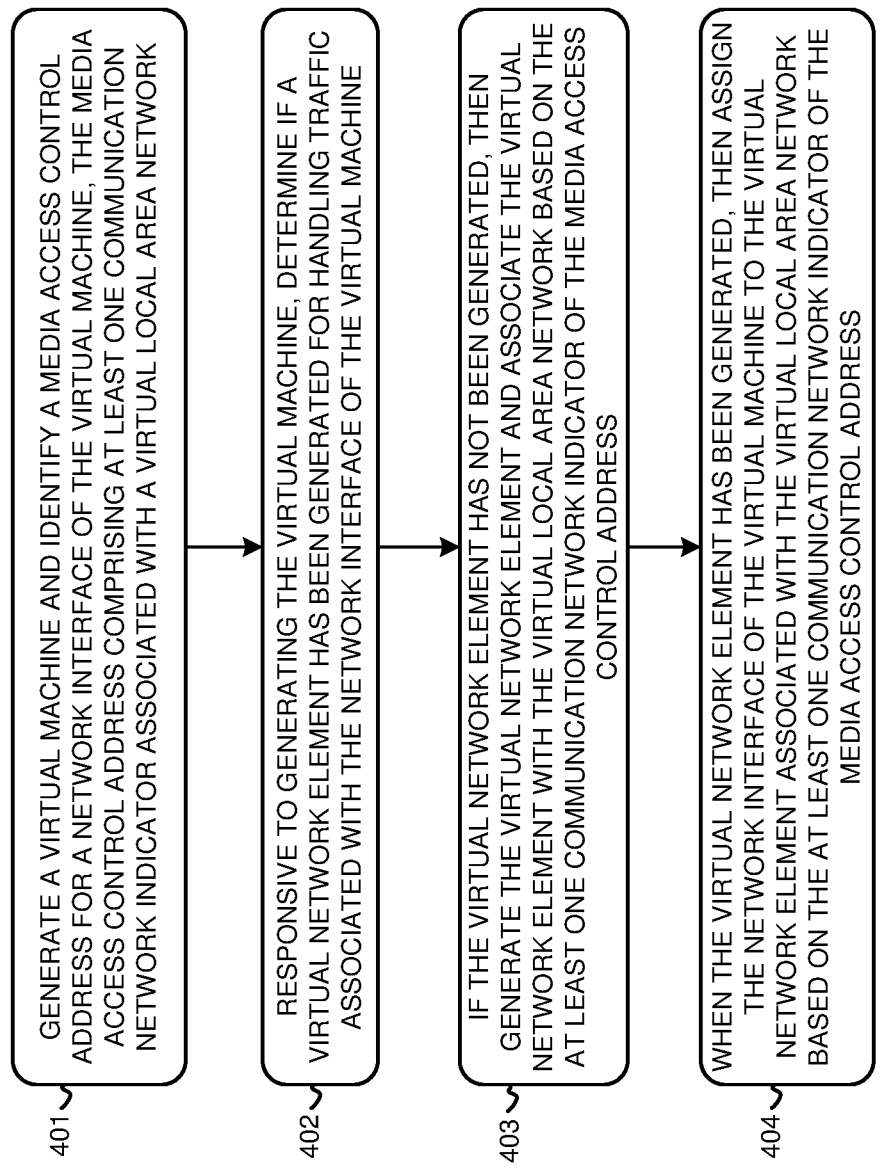
FIG. 4 is a flow diagram illustrating a method of operation of a virtualized communication networking environment.

In operation, virtual machine 112 can include an application, operating system, among other virtualized elements associated with a virtual machine. Virtual machine 112 also includes virtual network interface 113 for communicating with other network elements. Virtual machine 112 can exchange communications over vLAN 151 via virtual switch entity 121, and with other elements through virtual bridge entity 130. During an initial time, virtual machine 112, virtual switch entity 121, and virtualized local area network 151 might not have been yet generated and thus do not exist. Responsive to virtual machine 112 becoming active or being generated, management entity 190 can generate ones of virtual switch entity 121 and virtualized local area network 151. FIG. 4 discusses this process in more detail.

FIG. 4 is a flow diagram illustrating a method of operating virtualized communication networking environment 100 as shown in FIG. 3. The operations of FIG. 4 are referenced below parenthetically. In FIG. 4, management system 190 generates (401) a virtual machine and identifies a MAC address for a network interface of the virtual machine, the MAC address comprising at least one communication network indicator associated with a virtualized local area network. Initially, virtual machine 112 is not generated and responsive to a command, instruction, or activity, management entity 190 generates virtual machine 112. In some examples, virtual machine 112 is generated by other systems, and responsive to user or network activity, such as a user desiring to use an application, database server, or other entity supported by virtual machine 112.

During generation of virtual machine 112, a virtual network interface is also established, namely network interface 113. Network interface 113 can include any network interface for establishing networked communications between virtual machine 112 and external virtual or non-virtual entities. Network interface 113 can include an Ethernet interface, among other network interfaces. Network interface 113 has at least one media access control address (MAC address) 181 associated therewith, where MAC address 181 is used by a particular media access layer of network interface 113 for transmitting and receiving communications on a network. MAC address 181 of network interface 113 includes at least one communication network indicator that identifies a particular network that network interface 113 should be associated with during generation or later interconnection. For example, the communication network indicator can include one or more bits of MAC address 181 that indicate to management system 190 that network interface 113 should be associated with a particular local area network or virtualized local area network. The communication network indicator can be predetermined and programmed into a generation routine for virtual machine 112 that automatically includes the communication network indicator in MAC address 181 for network interface 113.

As a non-limiting example of a MAC address and communication network indicator, FIG. 3 shows MAC address 181 having six octets, namely, FF:F1:FF:00:00:AB for network interface 113. The "1" digit in the second octet of the MAC address indicates a particular virtualized local area network that network interface 113 should be associated with once virtual machine 112 is generated or active, while the remainder of the bits can merely be organizationally unique identifiers (OUIs), network interface controller (NIC) specific bits, or other bits. Furthermore, the communication network indicator can comprise more than one bit, and can be positioned in any of the octets of the MAC address.

Responsive to generating the virtual machine, management system 190 determines (402) if virtual network elements have been generated for handling traffic associated with the network interface of virtual machine 112. Management system 190 determines if a vLAN, virtual switch entity, or virtual bridge entity have been generated to service communications for virtual machine 112. Initially, one or more of these virtualized network elements might not yet have been generated, such as when no other virtual machines have been established or active. However, in this example, virtual machine 111 has already been established, and thus some of the virtual network elements have already been established as well.

If virtual network elements have not been generated, then management system 190 generates (403) the virtual network elements and associates the virtual network elements with the virtualized local area network based on the at least one communication network indicator of media access control address 181. For example, if none of elements 121 and 151 have been generated, then management entity 190 first associates network interface 113 of virtual machine 112 with vLAN 151. To handle network traffic associated with network interface 113, virtual switch entity 121 is then generated and associated with vLAN 151 and network interface 113. To handle communication with other vLANs or to provide a level of isolation for virtual machine 112 on vLAN 151, virtual bridge entity 130 can be associated with vLAN 151. These various virtual network elements are automatically generated and associated with network interface 113 of virtual machine 112 based on management entity 190 detecting the communication network indicator included in MAC address 181 associated with network interface 113. It should be noted that although vLAN 150 and vLAN 151 are shown as separate vLANs in FIG. 3, vLAN 150 and vLAN 151 can comprise the same local area network.

When the virtual network elements have been generated, then management system 190 assigns (404) network interface 113 of virtual machine 112 to the virtual network element associated with the virtualized local area network based on the at least one communication network indicator of the media access control address. One or more of the virtual network elements might have already been generated, such as when virtual machine 110 or another virtual machine has already been generated and active. For example, a timer or tear-down time limit can be placed on the various virtual network elements of FIG. 3, and when no further traffic or no further virtual machines are using the various virtual network elements of FIG. 3, then these virtual network elements can be removed, inactivated, or otherwise un-instantiated. However, if these timers or tear-down time limits have not been reached, or if another virtual machine is still communicating through ones of the virtual network elements, then one or more of these virtual network elements might already have been generated. In such cases, management entity 190 can assign network interface 113 of virtual machine 112 to ones of these virtual network elements based on the communication network indicator in MAC address 181. This assignment can be responsive to virtual machine 112 becoming active or being generated, such as in operation 401.

Figure 5:
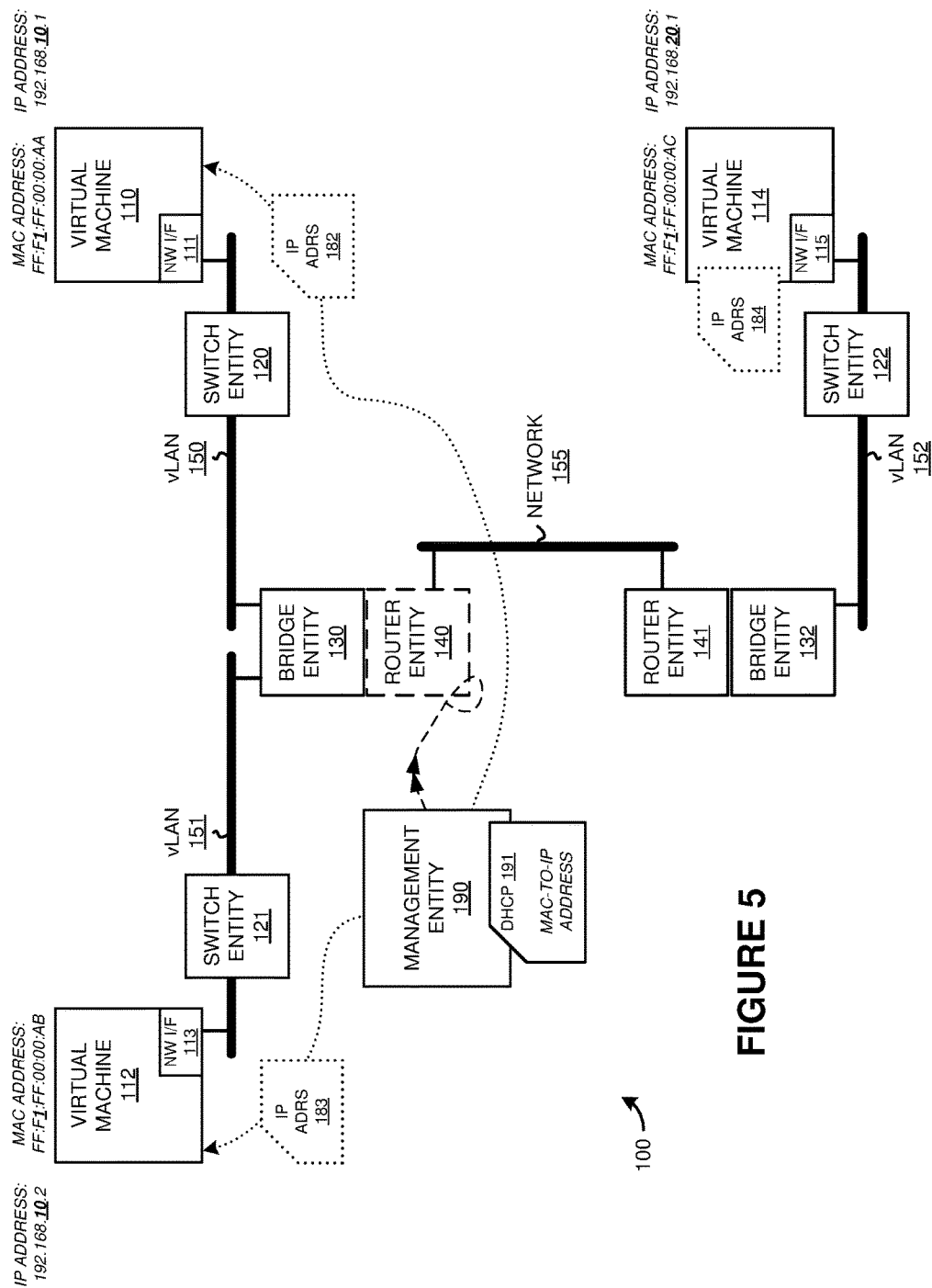
FIG. 5 is a system diagram illustrating a virtualized communication networking environment.

The operations discussed above are for two virtual machines that share a vLAN through bridge entity 130. Also, the operations discussed above use communication network indicators in MAC addresses to specify a vLAN, among other virtual network elements, so these virtual network elements can be automatically generated or associated with the appropriate virtual machines. When a virtual machine desires to route traffic over further networks, and at higher levels of network interconnection, such as layer 3 protocols, then further virtual network elements can be established. FIG. 5 discusses these further virtual network elements.

FIG. 5 is a system diagram illustrating virtualized communication networking environment 100. FIG. 5 adds additional virtualized elements, once the elements of FIG. 1 and FIG. 3 have been generated. As in FIGS. 1 and 3, virtualized communication networking environment 100 includes virtual machine 110, virtual machine 112, virtual switch entity 120, virtual switch entity 121, virtual bridge entity 130, virtual bridge entity 131, vLANs 150-151, and management entity 190. Virtual machine 110, virtual switch entity 120, and virtual bridge entity 130 communicate over vLAN 150. Virtual machine 112, virtual switch entity 121, and virtual bridge 130 communicate over vLAN 151.

Additionally, in FIG. 5, network 155 is included which comprises a layer 3 network, such as an Internet protocol (IP) network, among others. Another virtual machine 114 is included in FIG. 5, which is established according to the methods discussed above for FIGS. 1-4. Virtual network elements associated with virtual machine 114 have also been established responsive to virtual machine 114 being established and a MAC address associated with network interface 115 of virtual machine 114. These virtual network elements include virtual switch entity 122, virtual bridge entity 132, and vLAN 152. The MAC address associated with network interface 115 of virtual machine 114, namely FF:F1:FF:00:00:AC, indicates the same local area network as virtual machine 110 and virtual machine 112, and thus vLAN 151 can be the same local area network as vLAN 150 or vLAN 151.

However, in this example, the virtual elements generated automatically responsive to virtual machine 114 being generated cannot establish a vLAN connection with virtual bridge entity 130. For example, further isolation might be desired between virtual machine 114 and virtual machines 110 and 112, or virtual machine 114 might be located in a different physical location or different physical machine that requires network traffic to be routed over different networks. To route traffic between virtual bridge entity 132 and virtual bridge entity 130, virtual router entities are generated automatically according to an Internet protocol (IP) address assigned to the particular virtual machines, and will be discussed below in FIG. 6.

Figure 6:
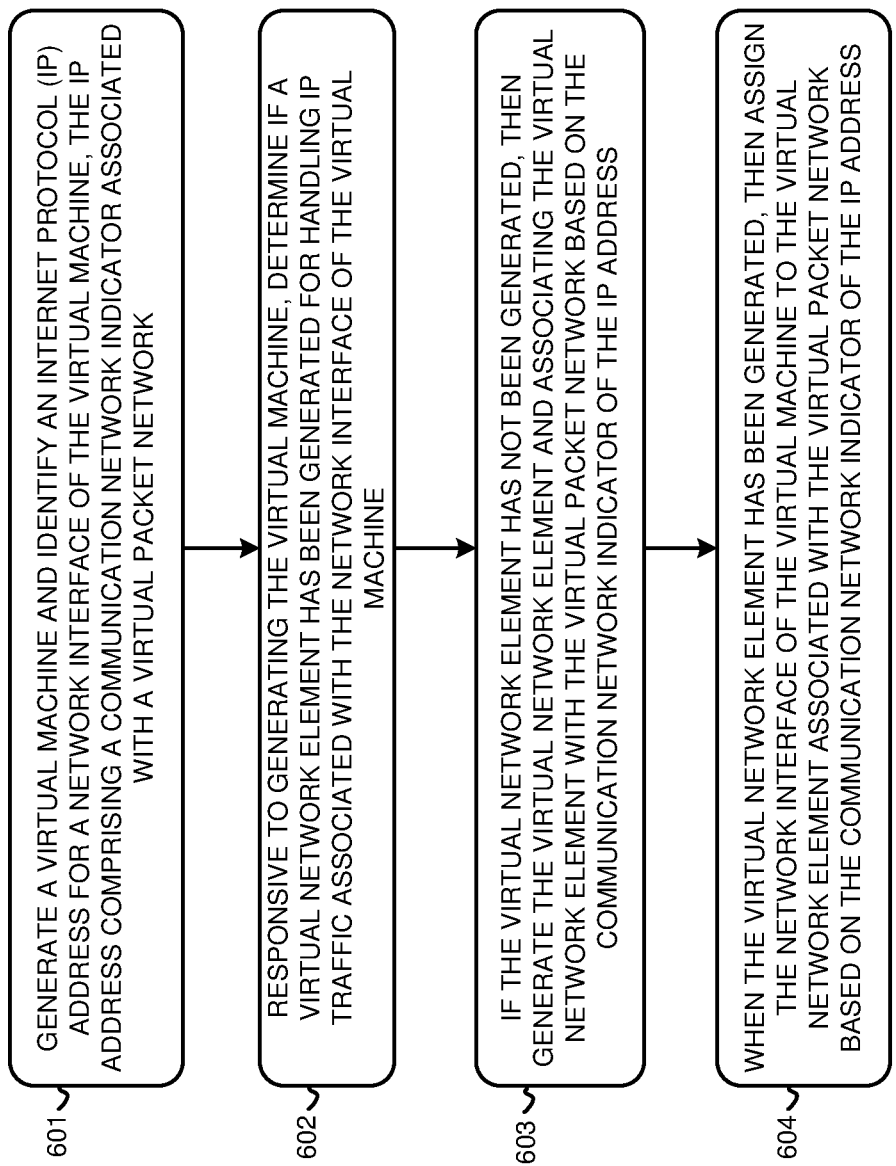
FIG. 6 is a flow diagram illustrating a method of operation of a virtualized communication networking environment.

FIG. 6 is a flow diagram illustrating a method of operating virtualized communication networking environment 100 as shown in FIG. 5. The operations of FIG. 6 are referenced below parenthetically. In FIG. 6, management system 190 generates (601) a virtual machine and identifies an IP address for a network interface of the virtual machine, the IP address comprising a communication network indicator associated with a virtual packet network. The virtual machine can include any of virtual machines 110, 112, or 114, and can be generated as discussed above for FIGS. 1-4.

The MAC address of the virtual machine can be used to generate or associate virtual network elements with the virtual machine, such as vLANs, virtual switch entities, or virtual bridge entities. However, these virtual entities typically are associated with a lower level of a network protocol stack, and are not typically employed to route communications across different networks or handle higher level network protocol stack communications for the virtual machines. For example, the MAC address generated entities can handle communications for a "layer 2" of a network protocol stack, and are not typically employed to route communications across different networks or handle "layer 3" network protocol stack communications for the virtual machines.

To identify the IP address for the network interface of the virtual machine, the virtual machine can first identify a MAC address for the network interface, and subsequently retrieve an IP address from management entity 190, or from other systems such as Dynamic Host Configuration Protocol (DHCP) server entities, based on the MAC address. For example, responsive to the MAC address of the virtual machine, management entity 190 identifies an IP address for the network interface identified by the MAC address, and transfers the IP address to the virtual machine for use by the network interface. As another example, in FIG. 5, management entity 190 can perform DHCP process 191 for MAC address to IP address translation. The MAC addresses can have specific IP addresses associated therewith based on the communication network indicators of the MAC addresses. Similar to how virtual network entities can be generated automatically responsive to a communication network indicator in a virtual machine MAC address, the DHCP process can identify an IP address for the network interface that provides the MAC address based on the communication network indicator in the MAC Address.

In FIG. 5, IP address 183 is associated with the MAC address network interface 113 of virtual machine 112. IP address 183 is 192.168.10.2 in this example. Likewise, IP address 182 is associated with the MAC address network interface 111 of virtual machine 110. IP address 182 is 192.168.10.1 in this example. IP address 184 is associated with the MAC address network interface 115 of virtual machine 114. IP address 184 is 192.168.20.1 in this example.

Each IP address in FIG. 5 also has at least one communication network indicator. In FIG. 5, this indicator is the third octet of the IP address, namely "10." The communication network indicator can act similar to the communication network indicator of the MAC addresses discussed herein, but relate to the automatic generation or association of further virtual network entities for virtual machines.

Responsive to generating the virtual machine, management system 190 determines (602) if a virtual network element has been generated for handling IP traffic associated with the network interface of the virtual machine. In this example, the virtual network element can include a virtual network router, virtual firewall, virtual firewall rules, or a virtualized network, such as an IP network. Management node 190 determines if any virtual network elements need to be generated for handling IP traffic associated with the virtual machines, such as for virtual machines 110, 112, and 114. For example, management entity 190 identifies an IP address associated with virtual machine 112 or with network interface 113 of virtual machine 112, namely IP address 183, and determines if any virtual router, virtual firewall, or virtualized IP network should be established or generated for IP traffic of virtual machine 112. IP elements for other virtual machines can be handled similarly.

If a virtual network element has not been generated, then management system 190 generates (603) the virtual network element and associates the virtual network element with the virtual packet network based on the communication network indicator of the IP address. For example, based on IP address 183, management system 190 generates at least virtual router entity 140 and associates virtual router entity 140 with IP address 183 for network interface 113 of virtual machine 113. Based on IP address 182, management entity 190 also associates virtual router entity 140 with IP address 182 for network interface 111 of virtual machine 110.

When the virtual network element has been generated, then management system 190 assigns (604) the network interface of the virtual machine to the virtual network element associated with the virtual packet network based on the communication network indicator of the IP address. Virtual router 140 can be assigned to handle routing IP traffic for virtual machine 110 and virtual machine 112, and virtual router 141 can be assigned to handle IP traffic for virtual machine 114. Virtual router 140 and virtual router 141 are connected by at least network 155, which can include one or more virtualized network portions and non-virtualized network portions. Virtual routers 140/141 can be included for IP isolation between virtual machines 110/112 and 114. In some examples, virtual router 141 is already generated due to virtual machine 114 being generated and the MAC address of virtual machine 114 translated into IP address 184.

Referring back to the elements of FIGS. 1, 3, and 5, virtual machines 110, 112, and 114 each comprise fictive software-based virtual machine elements. A virtual machine is a software implementation of a computing machine, and can be modeled to emulate any number of different kinds of computing systems. Virtual machines 110, 112, and 114 can each include virtualized hardware, software, operating system, applications, drivers, network interface cards, among other virtualized equipment. Virtual machines 110, 112, and 114 can each be generated by a hypervisor or virtual machine monitor. In many examples, each of virtual machines 110, 112, and 114 are generated to support a single type of application, such as a database, user authentication application, among other applications. Each of virtual machines 110, 112, and 114 can be run on one or more physical computing systems, such as servers, cloud systems, server systems, and the like.

Virtual network entities, such as virtual switches 120-122, virtual bridges 130 and 132, virtual routers 140-141, and virtualized local area networks 150-152 each comprise fictive software-based virtual network elements. The virtual network elements can comprise virtual machines, or software-based implementations of switches, bridges, routers, local area networks, and the like. Each of the virtual network entities is generated as-needed during generation of virtual machines 110, 112, and 114, to handle MAC-layer traffic and IP-layer traffic of the virtual machines. Virtual network elements can be used in-between each virtual machine to isolate network traffic of each virtual machine from each other. In one example, virtualized local area networks 150-152 each comprise a virtual Ethernet network, and virtualized IP network 155 comprises a virtual wide area network.

Management entity 190 comprises one or more computing systems for generating and destroying virtual machines and virtual network elements automatically in response to MAC addresses of virtual machines or translated IP addresses of virtual machines. In some examples, management entity 190 comprises hypervisor or virtual machine monitor elements, among other software and hardware elements. In FIG. 5, management entity 190 comprises DHCP functionality.

Figure 7:
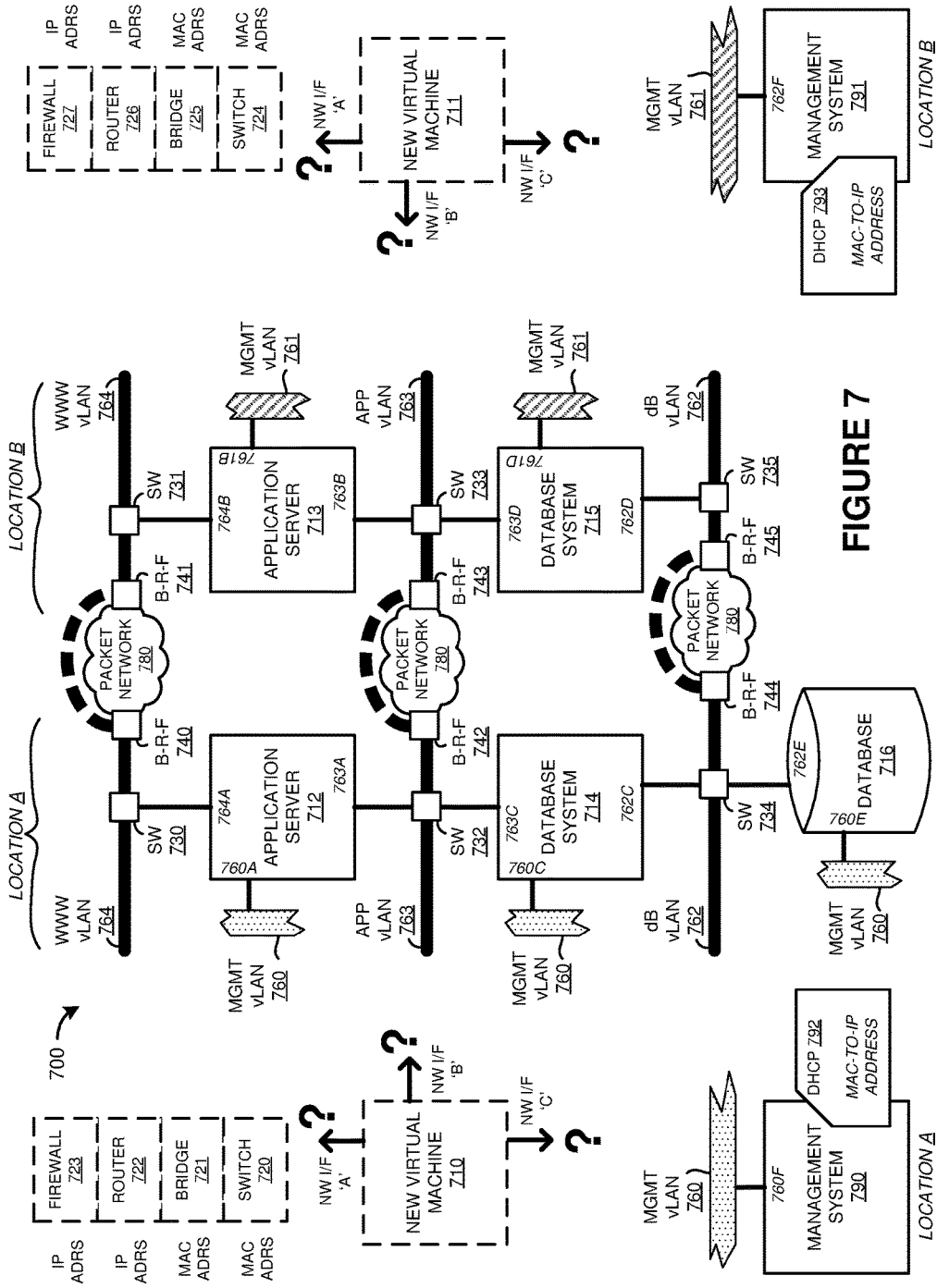
FIG. 7 is a system diagram illustrating a virtualized communication networking environment.

FIG. 7 is a system diagram illustrating virtualized communication networking environment 700. The various virtual network elements of FIG. 7 represent a virtualized communication networking environment for handling network communication traffic between virtual machines, namely application servers 712-713, database systems 714-715, as well as new virtual machines 710-711. FIG. 7 illustrates two separate locations, denoted by "location A" and "location B" in FIG. 7. Packet network 780 is a physical network that interconnects location A with location B, and packet network 780 can include any number of physical networking elements such as the Internet or a wide area network system. Packet network 780 can span one or more physical points of presence or geographic locations. Management system 790 manages the virtual network and virtual machine environment for location A, and management system 791 manages the virtual network and virtual machine environment for location B. It should be understood that a different number of management systems can instead be included in FIG. 7.

Initially, each of application servers 712-713 and database systems 714-715 might not be instantiated, but can be instantiated as-needed by the associated local management system 790-791. Instantiation of application servers 712-713 and database systems 714-715 can follow the discussion above regarding FIGS. 1-6, among the discussion below.

Database systems 714-715 can act as an interface server between database 716 or other databases, and can provide access to database 716 to users, application servers 712-713, or other systems. For example, database 716 might include customer data, such as usage logs, user authorization or authentication data, credentials, or other data. Database systems 714-715 can allow other systems to access database 716, and database systems 714-715 can comprise virtual machines that are instantiated as-needed for access to database 716.

Application servers 712-713 are virtual machines that are instantiated as-needed to provide application access for other systems, such as equipment and systems of a cellular voice and data network or to end user devices, over WWW vLAN 763. Application servers 712-713 can also access database 716 through database systems 714-715. Application servers 712-713 can host one or more user applications, server applications, or other applications, such as user authentication and authorization applications, multimedia streaming applications, communication services applications, cloud services applications, data storage and retrieval interface applications, among other applications, including combinations thereof.

In FIG. 7, several virtualized local area networks (vLAN) are included to interconnect the various virtual machines and provide network communication pathways for each virtual machine. As with the virtual machines, these virtualized local area networks are instantiated as-needed. Also, each vLAN is instantiated and interconnected according to communication network indicators in MAC addresses or IP addresses of each virtual machine, such as described above for FIGS. 1-6. To support communication traffic of each virtual machine and vLAN, virtualized network elements are also instantiated as-needed and according to communication network indicators in MAC addresses or IP addresses of each virtual machine, such as described above for FIGS. 1-6. These virtualized network elements can include virtual switches (SW) 730-735 and virtual bridge-router-firewall (B-R-F) entities 740-745. The vLAN elements and virtualized network elements of FIG. 7 can be instantiated according to communication network indicators in MAC addresses of each virtual machine, and de-instantiated according to communication traffic thresholds or responsive to de-instantiation of associated virtual machines. The management systems at each location, namely management system 790 for location A and management system 791 for location B control the instantiation and de-instantiation of the virtual machines and virtualized network elements.

There are several virtualized local area networks in FIG. 7, and each represents a separate virtual layer 2 network fabric, such as a virtual Ethernet fabric. A first vLAN, namely management vLAN 760 is employed to provide management traffic and control for the virtual machines by management system 790 at location A, and each virtual machine hosted at location A includes a network interface for communicating over vLAN 760 with management system 790. A second vLAN, namely management vLAN 761 is employed to provide management traffic and control for the virtual machines by management system 791 at location B, and each virtual machine hosted at location B includes a network interface for communicating over vLAN 761 with management system 791. These management network interfaces and vLANs 760-761 can be used for control and management communications to instantiate and de-instantiate virtual machines or network elements, handle DHCP translation of MAC addresses into IP addresses for virtual machines, establish firewall rules for virtual machines, instruct network interfaces of virtual machines to associate with particular vLANs and virtual network elements, or establish routing rules for virtual network routers, among other functions.

A database vLAN 762 is employed for communication between database 716 and database systems 714-715, among other systems and network elements. In FIG. 7, vLAN 762 spans packet network 780 through a layer 2 tunneling protocol, such as a virtual private network (VPN), so that virtual machines and virtual network elements at location A and location B can communicate over vLAN 762 as if they shared a single local area network. Virtual network switches 734-735 provide virtualized network communication switching functionality for each of location A and B. Virtual network bridge-router-firewall (B-R-F) elements 744-745 provide virtualized layer 2 Ethernet bridging functionality, layer 3 IP routing functionality, and layer 3 firewall functionality for virtual machines on vLAN 762 over at least packet network 780. Although the functionality of B-R-F elements 744-745 are shown in one respective 'box' in FIG. 7, it should be understood that one or more separate virtualized 'boxes' could be employed.

An application vLAN 763 is employed for communication between database systems 714-715 and application servers 712-713, among other systems and network elements. In FIG. 7, vLAN 763 spans packet network 780 through a layer 2 tunneling protocol, such as a VPN, so that virtual machines and virtual network elements at location A and location B can communicate over vLAN 763 as if they shared a single local area network. Virtual network switches 732-733 provide virtualized network communication switching functionality for each of location A and B. Virtual network B-R-F elements 742-743 provide virtualized layer 2 Ethernet bridging functionality, layer 3 IP routing functionality, and layer 3 firewall functionality for virtual machines on vLAN 763 over at least packet network 780. Although the functionality of B-R-F elements 742-743 are shown in one respective 'box' in FIG. 7, it should be understood that one or more separate virtualized 'boxes' could be employed.

A world wide web (WWW) vLAN 763 is employed for communication between application servers 712-713 and external systems, such as end user devices and other cellular voice and data networks, among other systems and network elements. In FIG. 7, vLAN 764 spans packet network 780 through a layer 2 tunneling protocol, such as a VPN, so that virtual machines and virtual network elements at location A and location B can communicate over vLAN 764 as if they shared a single local area network. Virtual network switches 730-731 provide virtualized network communication switching functionality for each of location A and B. Virtual network B-R-F elements 740-741 provide virtualized layer 2 Ethernet bridging functionality, layer 3 IP routing functionality, and layer 3 firewall functionality for virtual machines on vLAN 764 over at least packet network 780. Although the functionality of B-R-F elements 740-741 are shown in one respective 'box' in FIG. 7, it should be understood that one or more separate virtualized 'boxes' could be employed.

Figure 8:
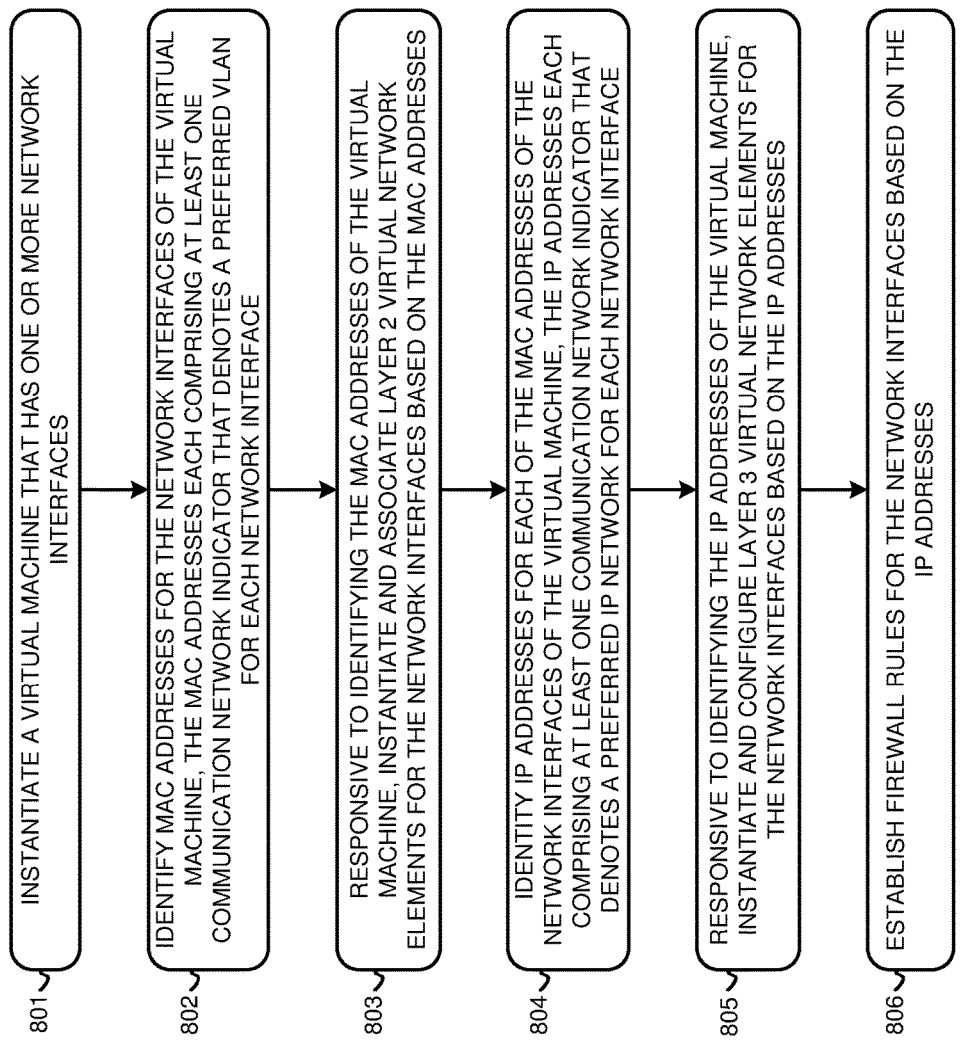
FIG. 8 is a flow diagram illustrating a method of operation of a virtualized communication networking environment.

Although FIG. 7 shows virtual machines and virtual network elements as being already instantiated, any of these virtual machines or network elements might not yet be instantiated. As an example of instantiation of new virtual elements, such as a virtual machine and associated virtual network elements, FIG. 8 is provided. FIG. 8 is a flow diagram illustrating a method of operation of virtualized communication networking environment 700.

In FIG. 8, a new virtual machine is slated for instantiation, as a first example, a new virtual machine 710 is to be instantiated for operation on a host at location A. A similar process can be followed for instantiation of new virtual machine 711 at location B. Management system 790 instantiates (801) a virtual machine that has one or more network interfaces. In this example, new virtual machine 710 has three network interfaces, namely network interfaces A, C, and C.

Figure 10:
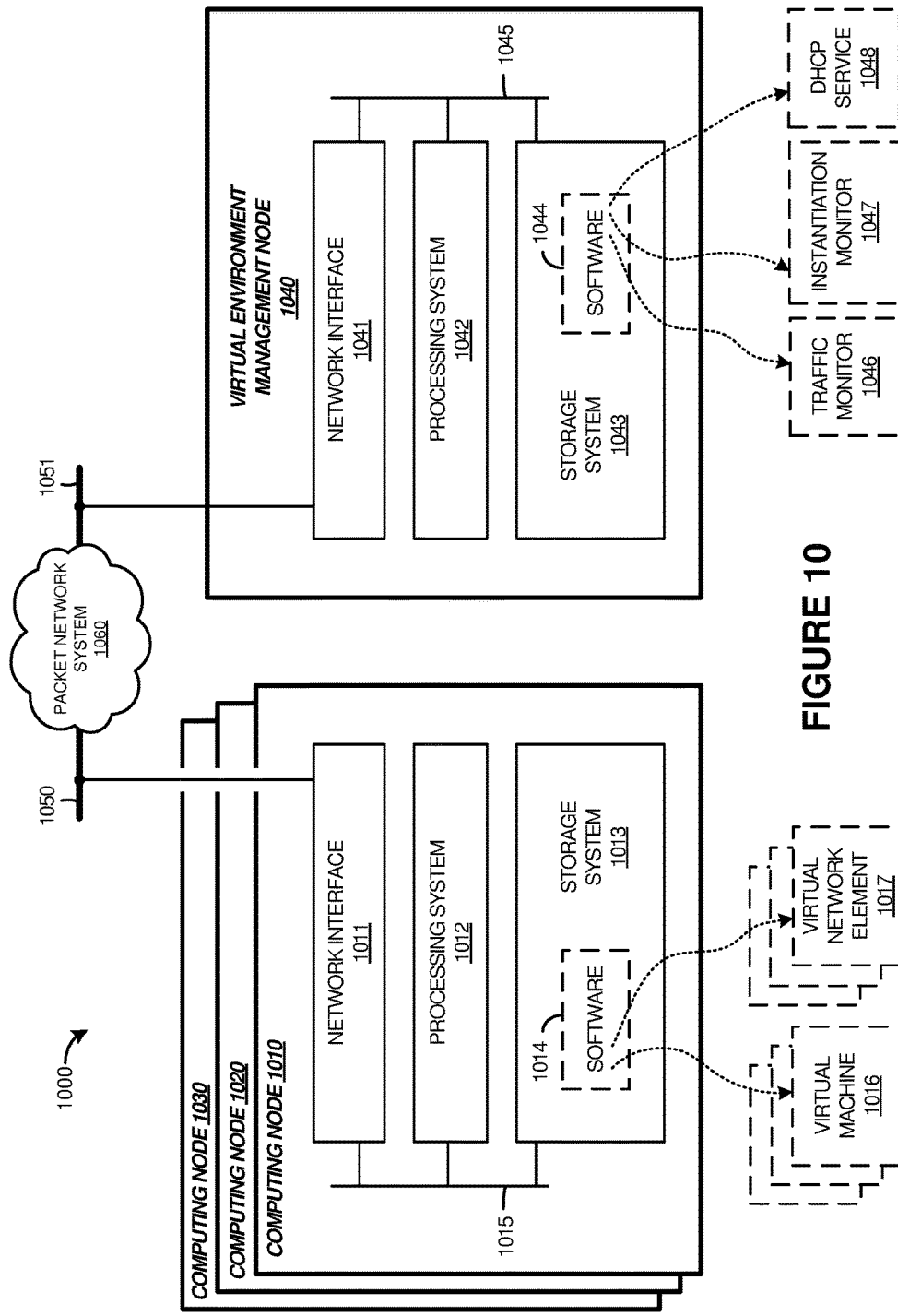
FIG. 10 is a block diagram illustrating virtualized communication network elements.

The virtual machine can be any virtual machine, which can include loading a file representing the virtual machine by a hypervisor entity. The virtual machine and associated hypervisor can be executed by one or more computer systems physically located at location A. These physical computer systems are not shown in FIG. 7, and instead the virtual entities which are hosted by the one or more computer systems are shown. FIG. 10 illustrates an example of the one or more computer systems.

The virtual machine can be instantiated responsive to user activity, or due to present needs of a communication network, among others. For example, when a user device desires to use a particular application, management system 790 can responsively instantiate a virtual machine as an application server to provide the application to the user device. Likewise, when database 716 is requested for use, a virtual machine can be instantiated as a database system to provide a virtual server for access to database 716. Other virtual machines can be instantiated for various purposes.

Management system 790 identifies (802) MAC addresses for the network interfaces of virtual machine 710, the MAC addresses each comprising at least one communication network indicator that denotes a preferred vLAN for each network interface. The communication network indicator comprises one or more bits of the MAC address of a particular network interface. The communication network indicator can be a predetermined bit or bits of the MAC address. In Ethernet networks, a MAC address includes six octets separated by colons, such as FF:FF:FF:FF:FF:FF. In this example, one or more bits in the MAC address indicates a particular vLAN that a network interface should be associated with once virtual machine 710 is generated or active, while the remainder of the bits can merely be organizationally unique identifiers (OUIs), network interface controller (NIC) specific bits, or other bits. Furthermore, the communication network indicator can be positioned in any of the octets of the MAC address.

Responsive to identifying the MAC addresses of the virtual machine, management system 790 instantiates (803) and associates layer 2 virtual network elements for the network interfaces based on the MAC addresses. First, vLANs are associated with each network interface, then virtual network elements are instantiated automatically based upon the MAC addresses.

As a first example of vLAN association, network interface A of virtual machine 710 can have a MAC address with a communication network indicator that indicates vLAN 764, network interface B of virtual machine 710 can have a MAC address with a communication network indicator that indicates vLAN 763, and network interface C can have MAC address with a communication network indicator that indicates vLAN 760. In another example of vLAN association, network interface A of virtual machine 710 can have a MAC address with a communication network indicator that indicates vLAN 763, network interface B of virtual machine 710 can have a MAC address with a communication network indicator that indicates vLAN 762, and network interface C can have MAC address with a communication network indicator that indicates vLAN 760. These MAC addresses can be predetermined and programmed into the virtual machine so that upon instantiation of the virtual machine, the MAC addresses will be already assigned to the various network interfaces of the virtual machine. In this manner, a virtual machine automatically indicates one or more vLANs based on the one or more MAC addresses associated with network interfaces. For example, if a MAC address associated with network interface A of virtual machine 710 is FF:FF:FF:FE:FF:FF, the bytes in the "FE" octet can indicate a particular vLAN, such as vLAN 764, whereas if a MAC address associated with network interface B of virtual machine 710 is FF:FF:FF:FA:FF:FF, the bytes in the "FA" octet can indicate a particular vLAN, such as vLAN 763.

Once the particular vLANs are associated with particular network interfaces of virtual machine 710, then various layer 2 virtual network elements can be instantiated. For example, virtual switch 720 can be instantiated based on the MAC address of network interface A, and if the particular vLAN associated with network interface A is vLAN 764, then virtual switch 720 can be employed to switch Ethernet traffic for at least virtual machine 710 on vLAN 764. Likewise, virtual bridge 721 can be instantiated based on the MAC address of network interface A, and if the particular vLAN associated with network interface A is vLAN 764, then virtual bridge 721 can be employed to bridge Ethernet traffic for at least virtual machine 710, perhaps to bridge vLAN 764 of location A to vLAN 764 of location B.

To determine if a particular virtual network element should be instantiated responsive to an instantiation of the virtual machine, management system 790 can process various factors. A first factor can be the vLAN that is indicated by the MAC address. This first factor can determine if the vLAN indicated already has a virtual switch instantiated to switch network traffic for virtual machines on the vLAN. Another factor can be that the MAC address itself—in addition to indicating a particular vLAN—can also indicate if a virtual switch is desired for the particular network interface of the virtual machine. One or more bits of the MAC address can indicate if a virtual switch should be instantiated. A virtual bridge can be indicated in a similar manner.

In addition to any layer 2 or Ethernet virtual entities that have been instantiated and associated with the proper network interfaces of the virtual machine based on MAC addresses, management system 790 can identify IP addresses for the network interfaces. Management system 790 thus identities (804) IP addresses for each of the MAC addresses of the network interfaces of the virtual machine, the IP addresses each comprising at least one communication network indicator that denotes a preferred IP network for each network interface.

To identify the IP addresses, a translation process typically occurs to translate a layer 2 Ethernet MAC address into a layer 3 IP address. This translation process can occur in management system 790, such as in DHCP 792, or can occur in separate translation systems. Once the IP address is translated from the MAC address, the IP address is typically transferred to the virtual machine for use by the network interface that the MAC address was associated with, and subsequent IP traffic originating from that network interface of the virtual machine uses the IP address as an origin address in IP packets.

The communication network indicator, different than the communication network indicator of the MAC addresses, comprises one or more bits of the IP address of a particular network interface. The communication network indicator can be a predetermined bit or bits of the IP address. In IP networks, an IPv4 address includes 4 decimal octets separated by periods, such as 192.168.1.1. IPv6 addresses include 16 octets. In this example, one or more bits in the IP address indicates a particular IP network that a network interface should be associated with once virtual machine 710 is generated or active, while the remainder of the bits can used for traffic routing purposes, among other bits. Furthermore, the communication network indicator can be positioned in any of the digits of the IP address.

Responsive to identifying the IP addresses of virtual machine 710, management system 790 instantiates (805) and configures layer 3 virtual network elements for the network interfaces based on the IP addresses. These layer 3 network elements are automatically instantiated or configured according to the communication network indicators in the IP addresses. In typical layer 3 elements, such as IP routers, a router table must be configured with at least next-hop information before the router can route traffic between nodes identified by IP addresses. Typical virtual routers also must have a router table preconfigured with predetermined IP addresses. However, in the examples discussed herein, a virtual router, or other virtual network elements, can automatically be configured based on the communication network indicators in the IP addresses assigned to virtual machines. Specifically, management system 790 instantiates and configures virtual router 722 and virtual firewall 723 based on the communication network indicators in the IP addresses assigned to network interfaces A-C of virtual machine 710.

As a first example, network interface A of virtual machine 710 can have a first MAC address that is translated to a first IP address, network interface B of virtual machine 710 can have a second MAC address that is translated to a second IP address, and network interface C can have a third MAC address that is translated to a third IP address. The first IP address can have a first communication network indicator included therein, the second IP address can have a second communication network indicator included therein, and the third IP address can have a third communication network indicator included therein. Alternatively, the MAC addresses can be translated into IP addresses without communication network indicators, but can instead instruct the IP address translation process to assign the particular network interface to a particular IP subnet. For example, a communication network indicator in a first MAC address of network interface A can instruct management system 790 to translate the first MAC address into a first IP address and a first subnet. This subnet can be used to associate virtual machines with other virtual machines on the same subnet, such as by using a subnet mask or classless inter-domain routing (CIDR) "slash" notation to indicate a sub-portion of the IP address range that is shared by a particular IP subnetwork. The communication network indicator in the MAC address of a network interface of a virtual machine can thus indicate which subnet the network interface is to be associated with.

In addition to an IP address and subnet translation and assignment, various layer 3 virtual network elements can be instantiated and configured. For example, virtual router 722 and virtual firewall 723 can be instantiated and configured based on not only the communication network indicator included in the MAC address of virtual machine network interfaces, but also based on the IP address or subnet of the translated MAC address. For example, if no virtual router has been instantiated for network interface A of virtual machine 710, then virtual router 722 can be instantiated to route traffic based on the IP address and subnet of network interface A of virtual machine 710. Likewise, virtual firewall 723 can be instantiated, and firewall rules automatically assigned to firewall 723 based on any of the MAC address or the IP address of network interface A.

However, if any of these layer 3 virtual network elements are already instantiated, possibly due to other virtual machines that have already been instantiated, then instead of instantiating new layer 3 virtual network elements, management system 790 can configure existing virtual network elements based on the MAC addresses or IP addresses (or communication network indicators included therein). For example, virtual router function of B-R-F 740 can be configured to route IP traffic associated with network interface A of virtual machine 710.

Also, management system 790 can establish (806) firewall rules for the network interfaces based on the IP addresses. For example, virtual firewall function of B-R-F 740 can be configured to handle firewall rules according to the IP address or particular application of virtual machine 710. The MAC address of network interface A of virtual machine 710 can include a communication network indicator that specifies a particular application or purpose of virtual machine 710. For example, virtual machine 710 can run a voice over IP (VoIP) application which requires a certain IP port configuration to pass associated IP traffic through a firewall. These firewall rules can be automatically generated by management system 790 responsive to the communication network indicator in the MAC address of network interface A of virtual machine 710. Specifically, a bit or bits of the MAC address of network interface A of virtual machine 710 can indicate a particular rule or rules for handling traffic associated with that network interface through any associated firewall.

In a further example of the communication network indicators discussed herein, a portion of the bits of a MAC address can be dedicated to indicate various properties for the virtual machine and the network interface. Individual ones of the bits of the communication network indicator can indicate different desired virtual elements for the network interface. For example, a first bit of the communication network indicator can instruct a management system to instantiate a switch, a second bit can instruct to instantiate a bridge, a third bit can instruct to instantiate a router, while a fourth bit can instruct to instantiate a firewall. Furthermore, individual bits can be employed to indicate particular networks that these network elements and network interfaces should be assigned to by a management system. Specifically, a first series of bits can indicate a vLAN that the network interface should be assigned, a second series of bits can indicate an IP address range or subnet that the network interface should be assigned, and a third series of bits can indicate one or more firewall rules to configure a firewall for the network interface. Virtual bridge, virtual router, and virtual firewall elements, among other virtual network elements, can be instantiated and configured to handle the network traffic of the network interface. Other configurations and bit arrangements can be employed, but in most examples, one or more bits in the MAC address are employed to indicate various network assignments, network elements requirements, and configurations for a particular network interface. Thus, upon instantiation of a virtual machine, a network interface can drive a management system to automatically instantiate various network elements, configure those network elements, and assign the network interface to particular networks based at least upon the communication network indicators in the MAC address.

Once the various virtual network elements and virtual machines have been instantiated and automatically configured according to the MAC address, IP address, or subnet of the various virtual network interfaces, the communication traffic can be exchanged with the virtual machine and other virtual machines, end user devices, communication nodes, and communication networks. However, the need for a particular virtual machine and particular virtual network elements may rise and fall as demand from end users, communication nodes, or other virtual machines rises and falls. For example, a virtual machine might be instantiated to host a particular application or to access database 716, when this application or database access is no longer needed, then it can be wasteful to dedicated computing resources to these virtual machines and associated virtual network elements. Accordingly, these virtual machines and associated virtual network elements can be de-instantiated.

Figure 9:
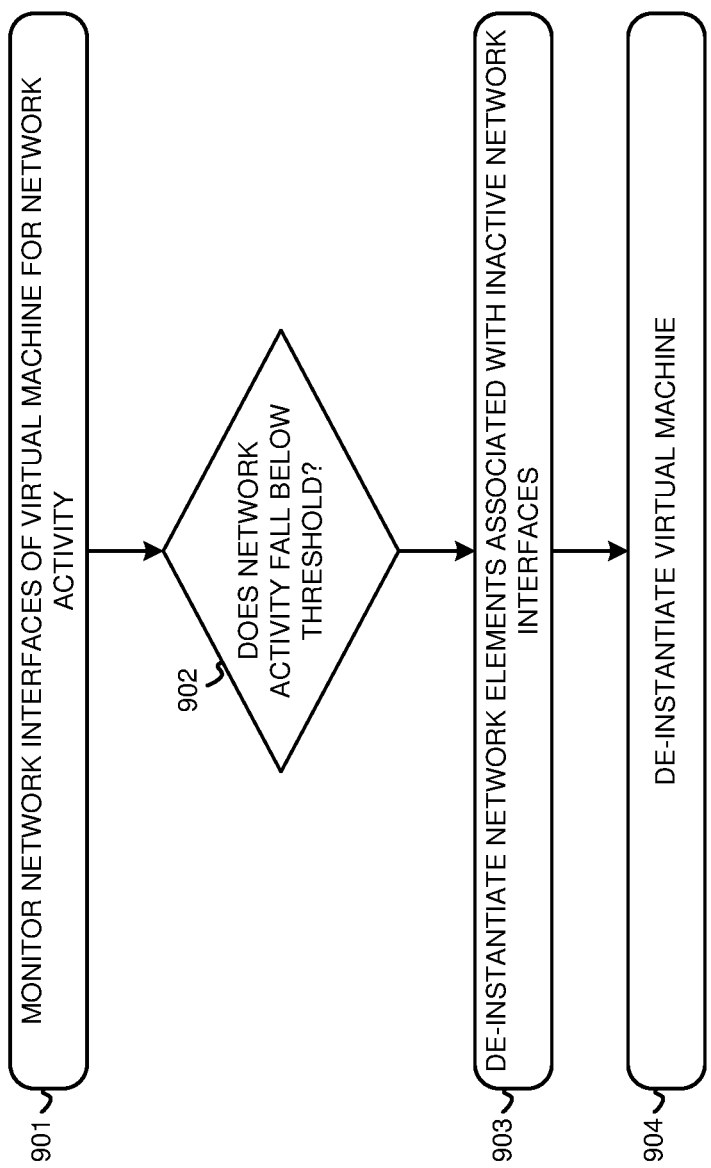
FIG. 9 is a flow diagram illustrating a method of operation of a virtualized communication networking environment.

As an example of de-instantiation of virtual elements, such as virtual machines and associated virtual network elements, FIG. 9 is provided. FIG. 9 is a flow diagram illustrating a method of operation of virtualized communication networking environment 700.

Management system 790 monitors (901) network interfaces of a virtual machine for network activity. This network activity can include Ethernet traffic or IP traffic of a particular network interface of a virtual machine, such as for any of virtual machines 710-715 of FIG. 7. Network activity can be monitored, such as by monitoring a packet or frame counts or rates for a particular network interface. In other examples, the usage of a particular virtual machine can be monitored, such as usage of a database server or application server by end user devices or by other virtual machines. For example, if a virtual machine is instantiated for use as an application server, then activity of that application server can be monitored.

If network activity falls below a threshold level (902) for a particular virtual machine or for a particular network interface of a virtual machine, then management system 790 can de-instantiate (903) network elements associated with inactive network interfaces or inactive virtual machines, and can de-instantiate (904) the associated virtual machines as well. The threshold can indicate that a particular network interface is no longer in use, or can indicate that a particular virtual machine is no longer in use.

If a particular network interface is no longer in use, such as by a usage or network activity falling below a threshold level, then management system 790 can de-instantiate virtual network elements that were previous instantiated for that network interface. For example, virtual switch 730 of FIG. 7 might have been instantiated responsive to a MAC address of network interface 764A of application server 712. Once network interface 764A is idle or falls below an activity threshold, then virtual switch 730 can be de-instantiated. This de-instantiation can advantageously save computing resources dedicated to the virtual network elements that service a particular network interface, and these computing resources can be re-allocated to other purposes, such as other virtual machines or other virtual network elements.

Likewise, when a virtual machine is no longer needed, such as when all network interfaces have activity levels that fall below a threshold level or when an application served by the virtual machine is no longer needed or in use, then the virtual machine itself can be de-instantiated. In some examples, the virtual machine monitors its own activity levels and can self-de-instantiate when no longer in use. In yet other examples, the virtual network elements can monitor their own traffic levels and determine when to de-instantiate themselves.

It should be noted that the discussion regarding FIGS. 7-9 relates to virtual machine 710 and management system 790 at location A in FIG. 7. However, a similar process and discussion can occur for virtual machine 711 and management system 791 at location B in FIG. 7. Furthermore, although management systems 790 and 791 are pictured in FIG. 7 as singular entities, it should be understood that management systems 790 and 791 can be distributed across one or more computing systems. Management systems 790 and 791 can each comprise physical computing systems, or can each comprise virtualized computing systems, including combinations thereof.

FIG. 10 is a block diagram illustrating virtualized communication network elements. The elements of FIG. 10 can be applied to those in system 100 of FIGS. 1, 3, and 5, or system 700 of FIG. 7, although variations are possible. The elements of FIG. 10 can represent the physical computing elements and systems that virtualized elements discussed herein can be instantiated upon. Moreover, the various management systems or management nodes discussed herein can also reside on the physical or virtual computing elements discussed in FIG. 10.

FIG. 10 illustrates virtualized communication network environment 1000 which includes computing nodes 1010, 1020, and 1030, along with virtual environment management node 1040. Each of computing nodes 1010, 1020, and 1030 can communicate over network link 1050 and through packet network system 1060. Virtual environment management node 1040 can communicate over network link 1051 and packet network system 1060.

Computing nodes 1010, 1020, and 1030 can include similar elements, but for simplicity, elements of computing node 1010 are discussed below. Computing node 1010 includes network interface 1011, processing system 1012, and storage system 1013. In operation, processing system 1012 is operatively linked to network interface 1011 and storage system 1014 by bus 1015. It should be understood that discrete links can be employed, such as network links or other circuitry. Computing node 1010 can be distributed or consolidated among equipment or circuitry that together forms the elements of computing node 1010. Computing node 1010 can optionally include additional devices, features, or functionality not discussed here for purposes of brevity.

Network interface 1011 includes one or more network interfaces for communicating over communication networks, such as the vLANs or packet networks discussed herein. The network interfaces can include an Ethernet interface, IP interface, or other local or wide area network communication interfaces which can communicate over a communication link. Examples of network interface 1011 include network interface card equipment, transceivers, modems, and other communication circuitry. In this example, network interface 1011 communicates over network 1050. Network 1050 can include any communication network link as described herein.

Processing system 1012 can comprise one or more microprocessors and other circuitry that retrieves and executes software 1014 from storage system 1013. Processing system 1012 can be implemented within a single processing device but can also be distributed across multiple processing devices or sub-systems that cooperate in executing program instructions. Examples of processing system 1012 include general purpose central processing units, application specific processors, and logic devices, as well as any other type of processing device, combinations, or variations thereof.

Storage system 1013 can comprise any computer readable storage media readable by processing system 1012 and capable of storing software 1014. Storage system 1013 can include volatile and nonvolatile, removable and non-removable media implemented in any method or technology for storage of information, such as computer readable instructions, data structures, program modules, or other data. In addition to storage media, in some implementations storage system 1013 can also include communication media over which software 1014 can be communicated. Storage system 1013 can be implemented as a single storage device but can also be implemented across multiple storage devices or sub-systems co-located or distributed relative to each other. Storage system 1013 can comprise additional elements, such as a controller, capable of communicating with processing system 1012. Examples of storage media include random access memory, read only memory, magnetic disks, optical disks, flash memory, virtual memory and non-virtual memory, magnetic cassettes, magnetic tape, magnetic disk storage or other magnetic storage devices, or any other medium which can be used to store the desired information and that can be accessed by an instruction execution system, as well as any combination or variation thereof, or any other type of storage media. In no case is the storage media a propagated signal.

Software 1014 can be implemented in program instructions and among other functions can, when executed by computing node 1010 in general or processing system 1012 in particular, direct computing node 1010 or processing system 1012 to load, run, and monitor virtual machines or virtual network elements, and present MAC addresses with communication network indicators to other systems, among other operations. Software 1014 can include additional processes, programs, or components, such as operating system software, database software, or application software. Software 1014 can also comprise firmware or some other form of machine-readable processing instructions executable by processing system 1012. In at least one implementation, the program instructions can include first program instructions that direct processing system 1012 to load, run, and monitor virtual machines or virtual network elements, and present MAC addresses with communication network indicators to other systems, among other operations. FIG. 10 shows one or more virtual machines 1016 and one or more virtual network elements 1017 as being instantiated by processing elements of any of computing nodes 1010, 1020, and 1030.

In general, software 1014 can, when loaded into processing system 1012 and executed, transform processing system 1012 overall from a general-purpose computing system into a special-purpose computing system customized to load, run, and monitor virtual machines or virtual network elements, and present MAC addresses with communication network indicators to other systems, among other operations. Encoding software 1014 on storage system 1013 can transform the physical structure of storage system 1013. The specific transformation of the physical structure can depend on various factors in different implementations of this description. Examples of such factors can include, but are not limited to the technology used to implement the storage media of storage system 1013 and whether the computer-storage media are characterized as primary or secondary storage. For example, if the computer-storage media are implemented as semiconductor-based memory, software 1014 can transform the physical state of the semiconductor memory when the program is encoded therein. For example, software 1014 can transform the state of transistors, capacitors, or other discrete circuit elements constituting the semiconductor memory. A similar transformation can occur with respect to magnetic or optical media. Other transformations of physical media are possible without departing from the scope of the present description, with the foregoing examples provided only to facilitate this discussion.

Virtual environment management node 1040 includes network interface 1041, processing system 1042, and storage system 1043. In operation, processing system 1042 is operatively linked to network interface 1041 and storage system 1014 by bus 1045. It should be understood that discrete links can be employed, such as network links or other circuitry. Virtual environment management node 1040 can be distributed or consolidated among equipment or circuitry that together forms the elements of virtual environment management node 1040. Virtual environment management node 1040 can optionally include additional devices, features, or functionality not discussed here for purposes of brevity.

Network interface 1041 includes one or more network interfaces for communicating over communication networks, such as the vLANs or packet networks discussed herein. The network interfaces can include an Ethernet interface, IP interface, or other local or wide area network communication interfaces which can communicate over a communication link. Examples of network interface 1041 include network interface card equipment, transceivers, modems, and other communication circuitry. In this example, network interface 1041 communicates over network 1050. Network 1051 can include any communication network link as described herein.

Processing system 1042 can comprise one or more microprocessors and other circuitry that retrieves and executes software 1044 from storage system 1043. Processing system 1042 can be implemented within a single processing device but can also be distributed across multiple processing devices or sub-systems that cooperate in executing program instructions. Examples of processing system 1042 include general purpose central processing units, application specific processors, and logic devices, as well as any other type of processing device, combinations, or variations thereof.

Storage system 1043 can comprise any computer readable storage media readable by processing system 1042 and capable of storing software 1044. Storage system 1043 can include volatile and nonvolatile, removable and non-removable media implemented in any method or technology for storage of information, such as computer readable instructions, data structures, program modules, or other data. In addition to storage media, in some implementations storage system 1043 can also include communication media over which software 1044 can be communicated. Storage system 1043 can be implemented as a single storage device but can also be implemented across multiple storage devices or sub-systems co-located or distributed relative to each other. Storage system 1043 can comprise additional elements, such as a controller, capable of communicating with processing system 1042. Examples of storage media include random access memory, read only memory, magnetic disks, optical disks, flash memory, virtual memory and non-virtual memory, magnetic cassettes, magnetic tape, magnetic disk storage or other magnetic storage devices, or any other medium which can be used to store the desired information and that can be accessed by an instruction execution system, as well as any combination or variation thereof, or any other type of storage media. In no case is the storage media a propagated signal.

Software 1044 can be implemented in program instructions and among other functions can, when executed by computing node 1010 in general or processing system 1042 in particular, direct computing node 1010 or processing system 1042 to generate virtual machines, identify MAC addresses for network interfaces of the virtual machines, generate virtual network elements based on communication network indicators in MAC addresses of network interfaces of the virtual machines, determining IP addresses based on MAC addresses of network interfaces of the virtual machines, associating the network interfaces of the virtual machines with virtual networks and virtual network elements, among other operations. Software 1044 can include additional processes, programs, or components, such as operating system software, database software, or application software. Software 1044 can also comprise firmware or some other form of machine-readable processing instructions executable by processing system 1042.

In at least one implementation, the program instructions can include first program instructions that direct processing system 1042 to generate virtual machines, identify MAC addresses for network interfaces of the virtual machines, generate virtual network elements based on communication network indicators in MAC addresses of network interfaces of the virtual machines, determining IP addresses based on MAC addresses of network interfaces of the virtual machines, associating the network interfaces of the virtual machines with virtual networks and virtual network elements, among other operations. FIG. 10 shows insanitation monitor 1047 which can handle instantiating and de-instantiating virtual machines. Traffic monitor 1046 can monitor network traffic or activity of network interfaces of virtual machines to determine when a network interface or virtual machine is idle, busy, or if traffic or activity levels fall below threshold levels. DHCP service 1048 can translate MAC addresses into IP addresses for virtual machines.

In general, software 1044 can, when loaded into processing system 1042 and executed, transform processing system 1042 overall from a general-purpose computing system into a special-purpose computing system customized to generate virtual machines, identify MAC addresses for network interfaces of the virtual machines, generate virtual network elements based on communication network indicators in MAC addresses of network interfaces of the virtual machines, determining IP addresses based on MAC addresses of network interfaces of the virtual machines, associating the network interfaces of the virtual machines with virtual networks and virtual network elements, among other operations. Encoding software 1044 on storage system 1043 can transform the physical structure of storage system 1043. The specific transformation of the physical structure can depend on various factors in different implementations of this description. Examples of such factors can include, but are not limited to the technology used to implement the storage media of storage system 1043 and whether the computer-storage media are characterized as primary or secondary storage. For example, if the computer-storage media are implemented as semiconductor-based memory, software 1044 can transform the physical state of the semiconductor memory when the program is encoded therein. For example, software 1044 can transform the state of transistors, capacitors, or other discrete circuit elements constituting the semiconductor memory. A similar transformation can occur with respect to magnetic or optical media. Other transformations of physical media are possible without departing from the scope of the present description, with the foregoing examples provided only to facilitate this discussion.

The figures and examples described herein discuss virtual machines and virtualized network elements. The term "generate" is used to denote beginning or starting a virtual machine or virtualized network element. It should be understood that terms such as "instantiate," "load," or "launch," among others, can instead be used to refer to generation of the virtual elements discussed herein. Likewise, when a virtual machine or virtualized network element is terminated, descriptive words such as "destroy," "end," "de-instantiate," "remove," or "shut down" can be employed, among others. It should be understood that these terms are merely variations on the descriptive process of instantiating virtual elements and de-instantiating these virtual elements.

The included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the invention. Those skilled in the art will also appreciate that the features described above can be combined in various ways to form multiple embodiments. As a result, the invention is not limited to the specific embodiments described above, but only by the claims and their equivalents.

What is claimed is:

1. A method of operating a computer system to establish data communications for a virtual machine, the method comprising:
   a management computer instantiating the virtual machine that is configured with a Media Access Control (MAC) address that comprises a bit sequence that triggers the automatic instantiation of an Internet Protocol (IP) connection for the virtual machine;
   responsive to detecting the MAC address of the virtual machine, the management computer automatically instantiating a virtual Local Area Network (vLAN) and a virtual Switch (vSW) on the vLAN to serve the virtual machine using the MAC address;
   responsive to detecting the MAC address of the virtual machine, the management computer allocating an IP address to the virtual machine and automatically instantiating a virtual Router (vRTR) to serve the vSW using the IP address; and
   a network computer executing the virtual machine, the vLAN, the vSW, and the vRTR and responsively exchanging user data between the virtual machine and a data communication network over the vSW, vLAN, and vRTR using the MAC address and the IP address.

2. The method of claim 1 further comprising:
   responsive to detecting the MAC address of the virtual machine, the management computer automatically instantiating a virtual Bridge (vBridge) on the vLAN to serve the vSW using the MAC address;
   the network computer executing the vBridge; and wherein the network computer exchanging the user data between the virtual machine and the data communication network comprises the network computer exchanging the user data over the vSW, the vLAN, the vBridge, and the vRTR using the MAC address and the IP address.

3. The method of claim 1 further comprising:
   responsive to detecting the MAC address of the virtual machine, the management computer automatically instantiating a virtual Firewall (vFirewall) to serve the vRTR using the IP address;
   the network computer executing the vFirewall; and wherein the network computer exchanging the user data between the virtual machine and the data communication network comprises the network computer exchanging the user data over the vSW, the vLAN, the vRTR, and the vFirewall using the MAC address and the IP address.

4. The method of claim 1 wherein the bit sequence that triggers the automatic instantiation of the IP connection comprises a bit sequence that triggers the automatic instantiation of the vLAN.

5. The method of claim 1 wherein the bit sequence that triggers the automatic instantiation of the IP connection comprises a bit sequence that triggers the automatic instantiation of the vSW.

6. The method of claim 1 wherein the bit sequence that triggers the automatic instantiation of the IP connection comprises a bit sequence that triggers the automatic instantiation of the vRTR.

7. The method of claim 1 wherein the vSW machine comprises an Ethernet switch.

8. The method of claim 1 wherein the vLAN comprises an Ethernet LAN.

9. The method of claim 1 wherein the virtual machine comprises an application server.

10. The method of claim 1 wherein the virtual machine comprises a database system.

11. A computer system to establish data communications for a virtual machine comprising:
    a management computer configured to instantiate the virtual machine that is configured with a Media Access Control (MAC) address that comprises a bit sequence that triggers the automatic instantiation of an Internet Protocol (IP) connection for the virtual machine;
    responsive to detecting the MAC address of the virtual machine, the management computer configured to automatically instantiate a virtual Local Area Network (vLAN) and a virtual Switch (vSW) on the vLAN to serve the virtual machine using the MAC address;
    responsive to detecting the MAC address of the virtual machine, the management computer configured to allocate an IP address to the virtual machine and configured to automatically instantiate a virtual Router (vRTR) to serve the vSW using the IP address; and
    a network computer configured to execute the virtual machine, the vLAN, the vSW, and the vRTR and responsively exchange user data between the virtual machine and a data communication network over the vSW, vLAN, and vRTR using the MAC address and the IP address.

12. The computer system of claim 11 further comprising:
    responsive to detecting the MAC address of the virtual machine, the management computer configured to automatically instantiate a virtual Bridge (vBridge) on the vLAN to serve the vSW using the MAC address; and the network computer configured to execute the vBridge to exchange the user data between the virtual machine and the data communication network using the MAC address and the IP address.

13. The computer system of claim 11 further comprising:
responsive to detecting the MAC address of the virtual machine, the management computer configured to automatically instantiate a virtual Firewall (vFirewall) to serve the vRTR using the IP address; and
the network computer configured to execute the vFirewall to exchange the user data between the virtual machine and the data communication network using the MAC address and the IP address.

14. The computer system of claim 11 wherein the bit sequence that triggers the automatic instantiation of the IP connection comprises a bit sequence that triggers automatic instantiation of the vLAN.

15. The computer system of claim 11 wherein the bit sequence that triggers the automatic instantiation of the IP connection comprises a bit sequence that triggers automatic instantiation of the vSW.

16. The computer system of claim 11 wherein the bit sequence that triggers the automatic instantiation of the IP connection comprises a bit sequence that triggers automatic instantiation of the vRTR.

17. The computer system of claim 11 wherein the vSW machine comprises an Ethernet switch.

18. The computer system of claim 11 wherein the vLAN comprises an Ethernet LAN.

19. The computer system of claim 11 wherein the virtual machine comprises an application server.

20. The computer system of claim 11 wherein the virtual machine comprises a database system.

* * * * *